United States Patent Office 2,857,388
Patented Oct. 21, 1958

2,857,388

Δ¹⁷-16β-CARBO-LOWER ALKOXY-3-EPIALLO-YOHIMBENES

Charles Ferdinand Huebner, Chatham, N. J., assignor to Ciba Pharmaceutical Products, Inc., Summit, N. J., a corporation of New Jersey No Drawing. Application November 13, 1956
Serial No. 621,518

4 Claims. (Cl. 260—287)

This invention relates to Δ¹⁷-16β-carbo-lower alkoxy-3-epiallo-yohimbenes, salts thereof and to a process for their preparation. These new esters may be represented by the formula:

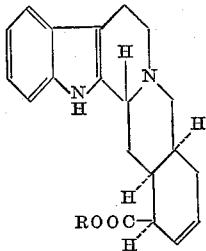

wherein R represents lower alkyl, such as ethyl or primarily methyl. Salts of these compounds are more especially acid addition salts such as those with inorganic acids, e. g. hydrochloric, hydrobromic, hydriodic, sulfuric, phosphoric, nitric or thiocyanic acid; or with organic acids, e. g. acetic, oxalic, citric, tartaric, hydroxyethane sulfonic, methane sulfonic acid and the like.

The esters of this invention, more especially the methyl ester, and their salts, have valuable properties.

They may be used as intermediates for the preparation of compounds having related structures, which are useful as pharmacological agents or in other fields of application.

Thus, the β,γ-unsaturated lower alkyl esters of this invention may, by treatment with an alkaline metal lower alkoxide, be converted into the corresponding Δ¹⁶-16-carbo-lower alkoxy-3-epiallo-yohimbenes and salts thereof.

For example, the β,γ-unsaturated methyl ester of this invention yields upon gentle treatment with sodium methoxide the Δ¹⁶-16-carbomethoxy-3-epiallo-yohimbene (also referable to as apo-3-epi-α-yohimbine) of the formula:

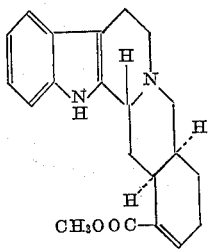

The Δ¹⁶-16-carbo-lower alkoxy-3-epiallo-yohimbenes, especially the apo-3-epi-α-yohimbine, and salts thereof, described in the copending application Serial No. 621,517 of C. F. Huebner and D. F. Dickel, filed on even date herewith, show hypotensive and adrenolytic activity and may be used as hypotensive agents.

Furthermore, the Δ¹⁷-16β-carbo-lower alkoxy-3-epiallo-yohimbenes and their salts may be converted to deserpidine and compounds of the deserpidine series having the formula:

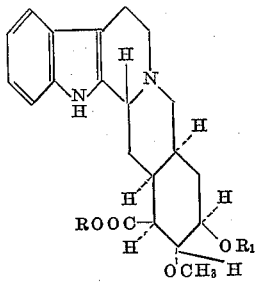

wherein R stands for lower alkyl, e. g. methyl or ethyl, and R₁ represents the acyl radical of a carboxylic acid, and salts thereof. R₁ represents more especially the radical of carbonic acid, e. g. ethyl carbonic acid; an acetic acid, e. g. acetic, acetoacetic or phenyl acetic; a propionic acid, e. g. propionic or cyclopentylpropionic acid; a benzoic acid, e. g. benzoic, 3,4-methylenedioxybenzoic or carbethoxysyringoic acid; a cinnamic acid, e. g. 3,4,5-trimethoxycinnamic acid; or above all the radical of 3,4,5-trimethoxy-benzoic acid. This transformation of Δ¹⁷-16-carbo-lower alkoxy-3-epiallo-yohimbenes and salts into deserpidine and compounds of the deserpidine series may be accomplished by treating the former with a peracid, e. g. perbenzoic or monoperphthalic acid, opening the 17,18-epoxide thus obtained with an alkaline metal, e. g. sodium, methoxide, and converting with a reactive functional derivative, e. g. a chloride or an anhydride of a carboxylic acid such as outlined above, particularly of 3,4,5-trimethoxy-benzoic acid, a lower alkyl deserpidate so obtained into a compound of the deserpidine series, e. g. deserpidine itself. Deserpidine and O-acyl derivatives of lower alkyl deserpidates and salts thereof exhibit valuable pharmacological properties and are useful as hypotensive and tranquilizing agents.

In addition, the Δ¹⁷-16-β-carbo-lower carbalkoxy-3-epiallo-yohimbenes can be used as active ingredients in sunburn compositions because of their capacity to absorb ultraviolet light in the wave length range critical in development of sunburns. They can be made up into sun screen compositions according to the customary methods employed in making such preparations. Preferably they may be incorporated into a hydrophilic ointment, which contains for example, glycols, such as propylene glycol, higher aliphatic alcohols such as stearyl alcohol, white petrolatum, distilled water and the like.

Moreover, by reaction with alkyl halides, the new esters may be converted into their quaternary ammonium compounds which have valuable properties. For example, the compounds obtained by quaternization with dodecyl chloride can be used as antiseptics. These compounds possess a marked activity against staphylococcus aureus.

I prepare the new Δ¹⁷-16β-carbo-lower alkoxy-3-epiallo-yohimbenes and the salts thereof by treating the tosylate ester of a 16β-carbo-lower alkoxy-17-acyloxy-18-hydroxy-3-epiallo-yohimbane or a salt thereof with a lithium halogenide in the presence of an organic base, refluxing the halogen compound thus obtained with zinc in acetic acid and isolating the Δ¹⁷-16β-carbo-lower alkoxy-3-epiallo-yohimbene or a salt thereof. A carbo-lower alkoxy group is represented by a carbethoxy and particularly by a carbomethoxy group. An acyloxy group is more especially a hydroxyl group acylated by a carbonic acid ester, e. g. ethyl carbonic acid; by an acetic acid, e. g. acetic, acetoacetic or phenylacetic; by a propionic acid, e. g. propionic acid or β-cyclopenthylpropionic acid; by a benzoic acid, e. g. benzoic acid, 3,4-methylenedioxybenzoic or carbethoxysyringoic acid; by a cinnamic acid, e. g. 3,4,5-trimethoxy-cinnamic acid, or above all by 3,4,5-trimethoxy-benzoic acid.

The lithium halogenide such as lithium chloride, lithium iodide and primarily lithium bromide is used more especially in the presence of an organic tertiary base, e. g. pyridine or collidine.

The reaction is carried out at room temperature or preferably at an elevated temperature. According to the working conditions the new compounds are obtained in the form of the free bases or salts thereof. From the latter the free bases can be obtained in the usual way, e. g. treatment with sodium or potassium hydroxide. The free bases may be converted into their salts with acids in the usual manner, e. g. treatment with acids such as those mentioned previously.

The starting materials used in the preparation of the compounds of this invention are new. They may be obtained, for example, from lower alkyl 17-O-acyl-raunescates by treating the latter with p-toluene-sulfonyl chloride in the presence of a base. An illustrative example of such a lower alkyl 17-O-acyl raunescate is isoraunescine which has been described by N. Hosansky and E. Smith in J. Am. Pharm. Assoc., 44, 639 (1955). The tosylate of isoraunescine is the preferred starting material.

The following examples will serve to illustrate the invention; they are not to be construed as being limitations thereon. Temperatures are given in degrees centigrade.

*Example 1*

0.5 g. of isoraunescine tosylate dissolved in 10 ml. of pyridine is heated on the steam bath with 1 g. of lithium bromide for six hours. The reaction mixture is then diluted with 200 g. of ice water and the crystalline bromo compound which separates is collected by filtration. It is recrystallized from a large volume of methanol and melts at 207° C.

0.25 g. of the above bromo compound dissolved in 10 ml. of glacial acetic acid is stirred and refluxed with 1 g. of zinc dust for 15 minutes. The zinc residue is filtered off and most of the acetic acid distilled off under reduced pressure. The residue is diluted with water, made basic with ammonia and extracted with 50 ml. of chloroform. The chloroform is washed with water, dried over sodium sulfate and distilled to dryness under reduced pressure. The crystalline β,γ-unsaturated ester of the formula:

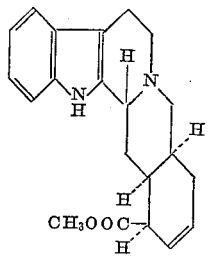

is recrystallized from a large volume of methanol, M. P. 223–225° C.

The starting material for the preparation of $\Delta^{17}$-16β-carbo-methoxy-3-epiallo-yohimbene may be prepared as follows:

To 1 g. of isoraunescine dissolved in 10 ml. of pyridine is added 1 g. of p-toluene-sulfonyl chloride with cooling to keep the temperature at 10° C. After standing overnight at this temperature, the reaction mixture is diluted with 20 g. of ice water and treated with 3 ml. of concentrated aqueous ammonia. The mixture is then extracted with 50 ml. of chloroform, the chloroform washed with water, dried over sodium sulfate and concentrated to dryness under reduced pressure. Isoraunescine tosylate crystallizes as the solvent is removed. It is collected with methanol in which it is very insoluble and recrystallized from a large volume of methanol. It melts at 227–230° C.

*Example 2*

The $\Delta^{17}$-16β-carbomethoxy-3-epiallo-yohimbene may be converted into the $\Delta^{16}$-16-carbomethoxy-3-epiallo-yohimbene as follows:

0.5 g. of the $\Delta^{17}$-16β-carbomethoxy-3-epiallo-yohimbene are refluxed for 30 minutes in 20 ml. of methanol containing 0.05 g. of dissolved sodium. Most of the methanol is distilled under reduced pressure and the residue diluted with water and extracted with 50 ml. of chloroform. The chloroform is washed with water, dried over sodium sulfate and distilled off under reduced pressure. The residue is dissolved in 20 ml. of ethanol and acidified with 6 N ethanolic hydrogen chloride. A prompt precipitate of the crystalline $\Delta^{16}$-16-carbomethoxy-3-epiallo-yohimbene hydrochloride appears which is recrystallized from methanol, M. P. 270–275° C.

What is claimed is:

1. A member of the group consisting of $\Delta^{17}$-16β-carbo-lower alkoxy-3-epiallo-yohimbene of the formula:

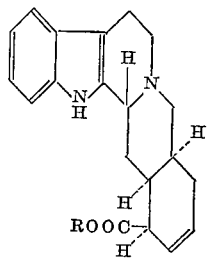

in which R represents lower alkyl, and salts thereof.

2. $\Delta^{17}$-16β-carbo-lower alkoxy-3-epiallo-yohimbene of the formula:

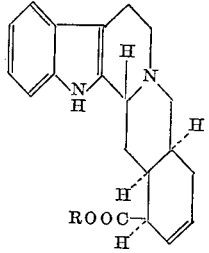

in which R stands for lower alkyl.

3. $\Delta^{17}$-16β-carbomethoxy-3-epiallo-yohimbene of the formula:

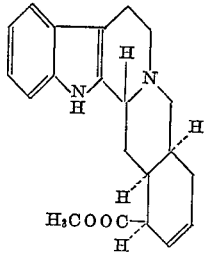

4. In a process for the preparation of a member of the group consisting of $\Delta^{17}$-16β-carbomethoxy-3-epiallo-yohimbene of the formula:

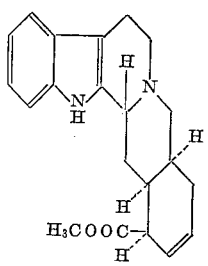

and salts thereof, the steps which comprise heating the tosylate ester of isoraunescine of the formula:
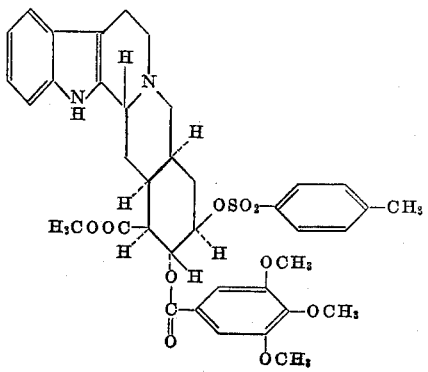
with lithium bromide in the presence of pyridine and refluxing the resulting bromo-compound with zinc in acetic acid.
References Cited in the file of this patent
Janot et al.: Bull. Soc. Chim. Mem. [5], vol. 16, May-June 1949.